(12) United States Patent
Freewalt

(10) Patent No.: US 8,042,223 B2
(45) Date of Patent: Oct. 25, 2011

(54) AIR-POWERED ROTARY RAKE

(75) Inventor: James L. Freewalt, St. Marys, OH (US)

(73) Assignee: Realtek Solutions, L.L.C., St. Marys, OH (US)

( * ) Notice: Subject to any disclaimer, the term of this patent is extended or adjusted under 35 U.S.C. 154(b) by 643 days.

(21) Appl. No.: 12/232,415

(22) Filed: Sep. 17, 2008

(65) Prior Publication Data

US 2009/0071115 A1   Mar. 19, 2009

Related U.S. Application Data

(60) Provisional application No. 60/973,116, filed on Sep. 17, 2007.

(51) Int. Cl.
*E01H 1/08* (2006.01)

(52) U.S. Cl. .............................. 15/405; 56/12.4; 56/13.8

(58) Field of Classification Search .................. 15/327.5, 15/344, 345, 383, 387, 405; 56/12.8, 13.3, 56/13.4, 17.5; 415/145, 151, 152.1, 152.2, 415/202, 206, 904; 416/204 R, 244 R; *A47L 9/08; E01H 1/05, 1/08*
See application file for complete search history.

(56) References Cited

U.S. PATENT DOCUMENTS

| | | | | |
|---|---|---|---|---|
| 848,343 A * | 3/1907 | Brown et al. ..................... | 415/60 |
| 2,791,082 A * | 5/1957 | McDonough et al. ......... | 56/13.4 |
| 3,526,467 A * | 9/1970 | Kime ....................... | 416/200 R |
| 4,404,706 A | 9/1983 | Loyd | |
| 4,560,307 A | 12/1985 | Deitesfeld | |
| 5,054,159 A | 10/1991 | Richardson | |
| 5,085,376 A | 2/1992 | Litchenburg | |
| D326,458 S | 5/1992 | Huber, Jr. | |
| 5,894,630 A * | 4/1999 | Bitner et al. ..................... | 15/330 |
| 5,991,973 A * | 11/1999 | Simpson ......................... | 15/402 |
| 6,041,463 A | 3/2000 | Stauch | |
| 6,073,305 A * | 6/2000 | Hesskamp ....................... | 15/405 |
| 6,185,918 B1 | 2/2001 | Nelson | |
| 6,349,475 B1 | 2/2002 | Buck | |
| 6,415,585 B2 * | 7/2002 | Morabit et al. ................ | 56/12.7 |
| 6,511,288 B1 * | 1/2003 | Gatley, Jr. ..................... | 415/206 |
| D497,692 S | 10/2004 | Nawrozki et al. | |
| 7,047,592 B2 * | 5/2006 | Sing et al. ...................... | 15/328 |
| 7,055,213 B2 * | 6/2006 | Iida et al. ........................ | 15/405 |
| D533,322 S | 12/2006 | Blateri | |

(Continued)

FOREIGN PATENT DOCUMENTS

EP          1 743 517 A1        1/2007

*Primary Examiner* — Monica Carter
*Assistant Examiner* — Michael Jennings
(74) *Attorney, Agent, or Firm* — Richard C. Litman

(57) ABSTRACT

The air-powered rotary rake is an attachment for a leaf blower or the like, providing the user with air-powered rotary blades to dislodge or agitate debris which, ordinarily, could not be moved easily with air blowing alone. The air-powered rotary rake includes a housing defining an open interior region and having opposed open front and rear ends. The rear end is adapted for releasable attachment to the leaf blower. An internal wall is mounted within a front portion of the housing and divides the housing into an upper passage and a lower passage. A spindle is rotatably mounted within the upper passage and a plurality of vanes are mounted on the spindle. When the pressurized air is diverted into the upper passage, the pressurized air impinges upon the vanes mounted on the spindle, causing the spindle to rotate and driving rotation of a plurality of blades also annularly mounted thereto.

20 Claims, 6 Drawing Sheets

U.S. PATENT DOCUMENTS

| | | | |
|---|---|---|---|
| 7,383,678 B2* | 6/2008 | Buss et al. | 56/13.3 |
| 7,735,188 B2* | 6/2010 | Shaffer | 15/405 |
| 7,739,800 B2* | 6/2010 | Hurley et al. | 30/276 |
| 7,814,615 B1* | 10/2010 | Ries | 15/405 |
| 7,922,443 B2* | 4/2011 | Yuasa | 415/121.2 |
| 2002/0108211 A1* | 8/2002 | Svoboda | 15/405 |
| 2002/0157209 A1* | 10/2002 | Marshall et al. | 15/328 |
| 2006/0005347 A1 | 1/2006 | Griffin et al. | |
| 2007/0029407 A1 | 2/2007 | Rappin | |
| 2008/0127621 A1 | 6/2008 | Bovo et al. | |
| 2009/0044835 A1* | 2/2009 | Peters | 134/25.1 |
| 2009/0071115 A1* | 3/2009 | Freewalt | 56/13.3 |
| 2009/0083934 A1* | 4/2009 | Vanderlinden | 15/383 |
| 2009/0083935 A1* | 4/2009 | Vanderlinden | 15/383 |

* cited by examiner

AIR-POWERED ROTARY RAKE

CROSS-REFERENCE TO RELATED APPLICATION

This application claims the benefit of U.S. Provisional Patent Application Ser. No. 60/973,116, filed Sep. 17, 2007.

BACKGROUND OF THE INVENTION

1. Field of the Invention

The present invention relates to lawn care equipment, and particularly to an air-powered rotary rake that can be attached to a leaf blower or the like.

2. Description of the Related Art

It is well know in the art of lawn maintenance to use high volume pressurized air yard blowers to blow away grass clippings, shrubbery clippings, yard debris and the like. Such air yard blowers are commonly used for the purpose of gathering tree leaves. Under normal conditions, an air yard blower can be used to gather leaves easily by moving them with a stream of high-pressure air. Such blowers are particularly useful in the removal of freshly fallen leaves that are supported above the ground on underlying blades of grass. These leaves are easily lifted by the air exiting an air yard blower nozzle. However, under some conditions, air yard blowers suffer deficiencies in gathering leaves. The conventional air yard blower's efficiency suffers, at least in part, due to the absence of a mechanical means to free leaves that become entangled between blades of grass.

While large leaves are generally supported by underlying blades of grass, small or thin leaves settle between blades of grass. Even the stems of large leaves sometimes become entangled between blades of grass, thus making their removal with an air yard blower difficult. When the stem of a large leaf is entangled between blades of grass, the operator of an air yard blower may attempt to free the leaf by increasing the blower's airflow. Increasing the airflow, however, may cause the leaf to be pressed against the ground or to just spin about its entangled stem. In such situations, the leaves are incapable of being swept away by the air yard blower.

Typical air yard blowers are often inefficient in leaf removal in the further situation of leaves that have piled on top of one other. These leaves become heavy and have a tendency to stick together and also stick to the grass. This tendency to stick increases when there is moisture present from rain or dew and is further increased when moisture freezes. Often, when sticking occurs, the air stream from a blower will be incapable of moving the leaves.

Also, conventional blowers tend to be inefficient in removal of yard debris when rocks, bark, vegetation or flowering plants, bird droppings, sticks and other natural and foreign matter are present. Further, since many ground coverings include vegetation that has large leaves, it is easy for fallen leaves to become caught between them. Furthermore, shrubbery leaves are generally smaller than leaves from trees and often settle on ground covering during trimming. In such situations, and in the presence of material such as heavy sticks, tangled weeds, dried bird droppings and the like, it is often impossible to remove leaves and other yard debris with the pressurized air generated by the blower alone. It would be desirable to provide a mechanical removal means in combination with the pressurized air in order to aid in the removal of yard debris. Thus, an air-powered rotary rake solving the aforementioned problems is desired.

SUMMARY OF THE INVENTION

The air-powered rotary rake is an attachment for a leaf blower or the like, providing the user with air-powered rotary rake members to dislodge or agitate debris that ordinarily could not be moved easily with air blowing alone. The air-powered rotary rake includes a housing defining an open interior region and having opposed open front and rear ends. The rear end thereof is adapted for releasable attachment to a conventional leaf blower or the like.

An internal wall is mounted within a front portion of the housing, with the internal wall and an interior surface of the front portion of the housing defining an upper passage and a lower passage. The internal wall further divides the open front end of the housing into an open upper front end and an open lower front end.

A spindle is rotatably mounted within the upper passage of the front portion of the housing. A plurality of vanes or paddles extend radially from the spindle, and a pair of retaining wheels are respectively secured to laterally opposed ends of the spindle. The pair of retaining wheels are positioned external to the front portion of the housing.

A plurality of raking members or tines are releasably attached to the pair of retaining wheels, and a flap is pivotally mounted within the housing for selectively diverting the pressurized air into the upper passage and through the open upper front end of the housing, or into the lower passage and through the open lower front end of the housing. In operation, when the pressurized air is diverted into the upper passage, the pressurized air impinges upon the plurality of vanes mounted on the spindle, causing the spindle to rotate, and rotation of the spindle drives rotation of the plurality of rake members.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
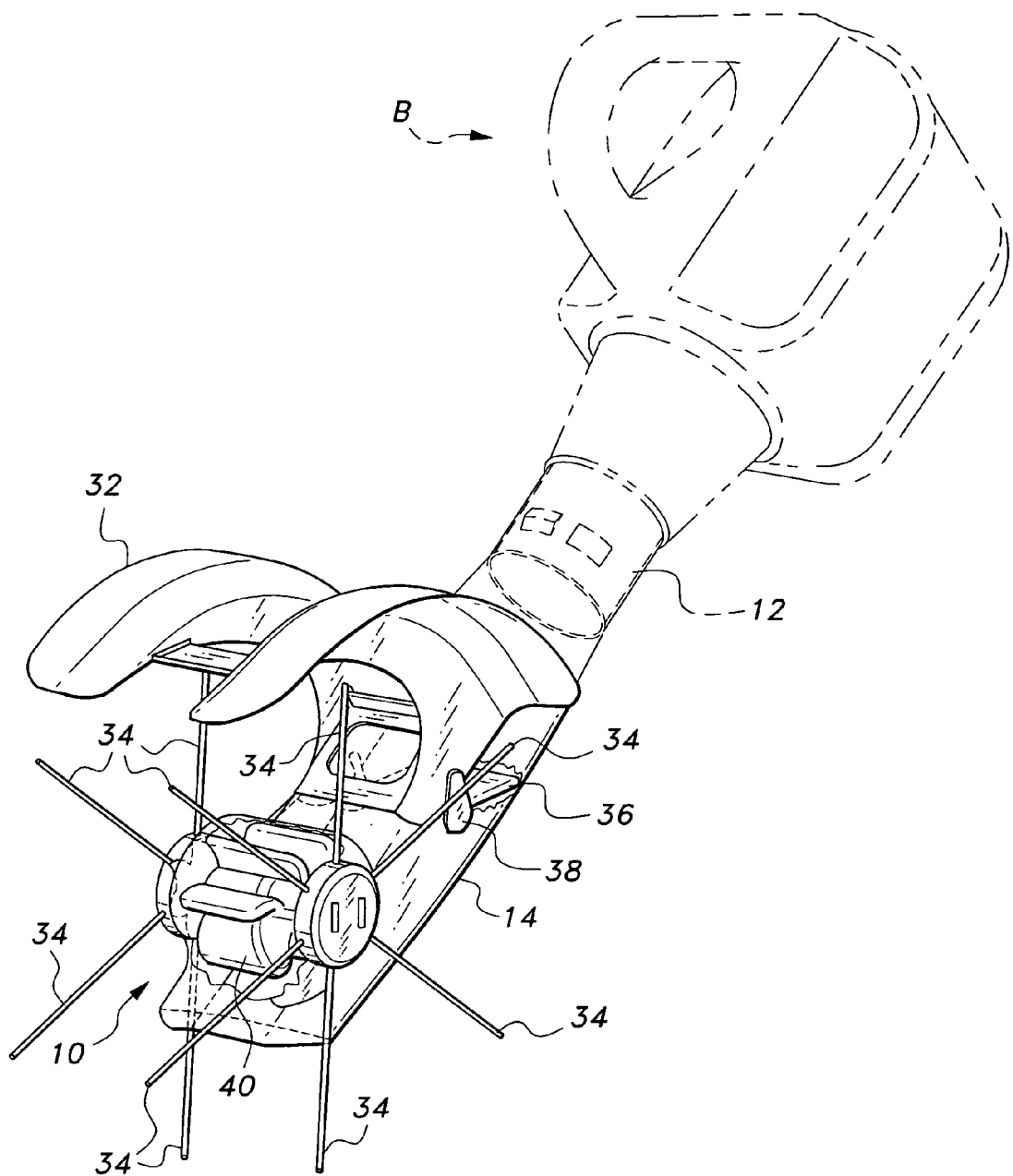
FIG. 1 is an environmental, perspective view of an air-powered rotary rake according to the present invention, shown with the spindle housing broken away to show details thereof.

The air-powered rotary rake 10, as best shown in FIG. 1, is an air-powered rotary rake 10 that may be attached to a leaf blower or the like to allow the leaf blower to function as a rake or broom, providing the user with air-powered rotary tines or rake members 34 to dislodge or agitate debris, such as bundles of sticks, packed leaves and the like, that ordinarily could not be moved easily with air blowing alone. It should be understood that leaf blower B, shown in FIG. 1, is illustrated for exemplary purposes only, and that air-powered rotary rake 10 may be used with any suitable air blower, such as leaf blowers, vacuum cleaners with blowing capability, or the like.

Figure 2:
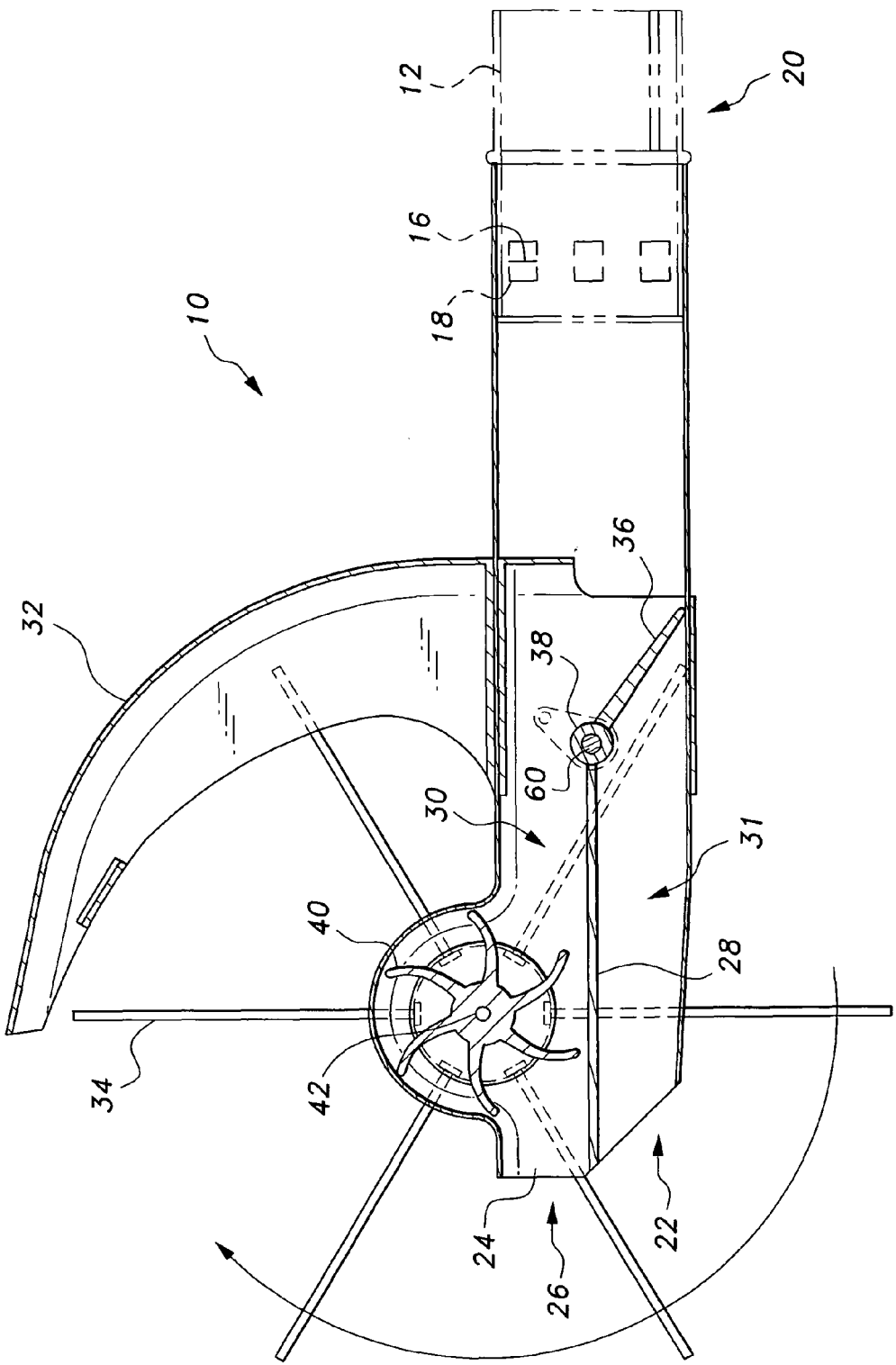
FIG. 2 is a side view in section of the air-powered rotary rake according to the present invention, showing the housing configured for airflow through an upper passage.

As best shown in FIGS. 1 and 2, the air-powered rotary rake 10 includes a hollow housing 14 having a rear end 20 and a front portion 26. Rear end 20 is preferably tubular and sized to mate with blower tube 12 of blower B. Rear end 20 of housing 14 may be manufactured in a variety of dimensions and configurations to mate with a variety of different blower tubes 12. Conventional leaf blowers, such as leaf blower B, are typically provided with elongated forward portions, which are mounted to the blower tube 12. Housing 14 is designed to replace the conventional, elongated forward portion of blower B, and attaches to blower tube 12 in the conventional manner of the original elongated forward portion. For example, the connection may include detents 16, which releasably mate with openings 18 formed in rear end 20, as shown. It should be noted that a plurality of detents 16 and corresponding openings 18 may be provided, allowing for angular adjustment of the housing 14 with respect to the blower B. Alternatively, adapter sleeves in a variety of sizes may be provided, allowing attachment to a variety of different blowers. As a further alternative, the air-powered rotary rake 10 may be provided integrally with a blower, rather than as a separate attachment.

Figure 6:
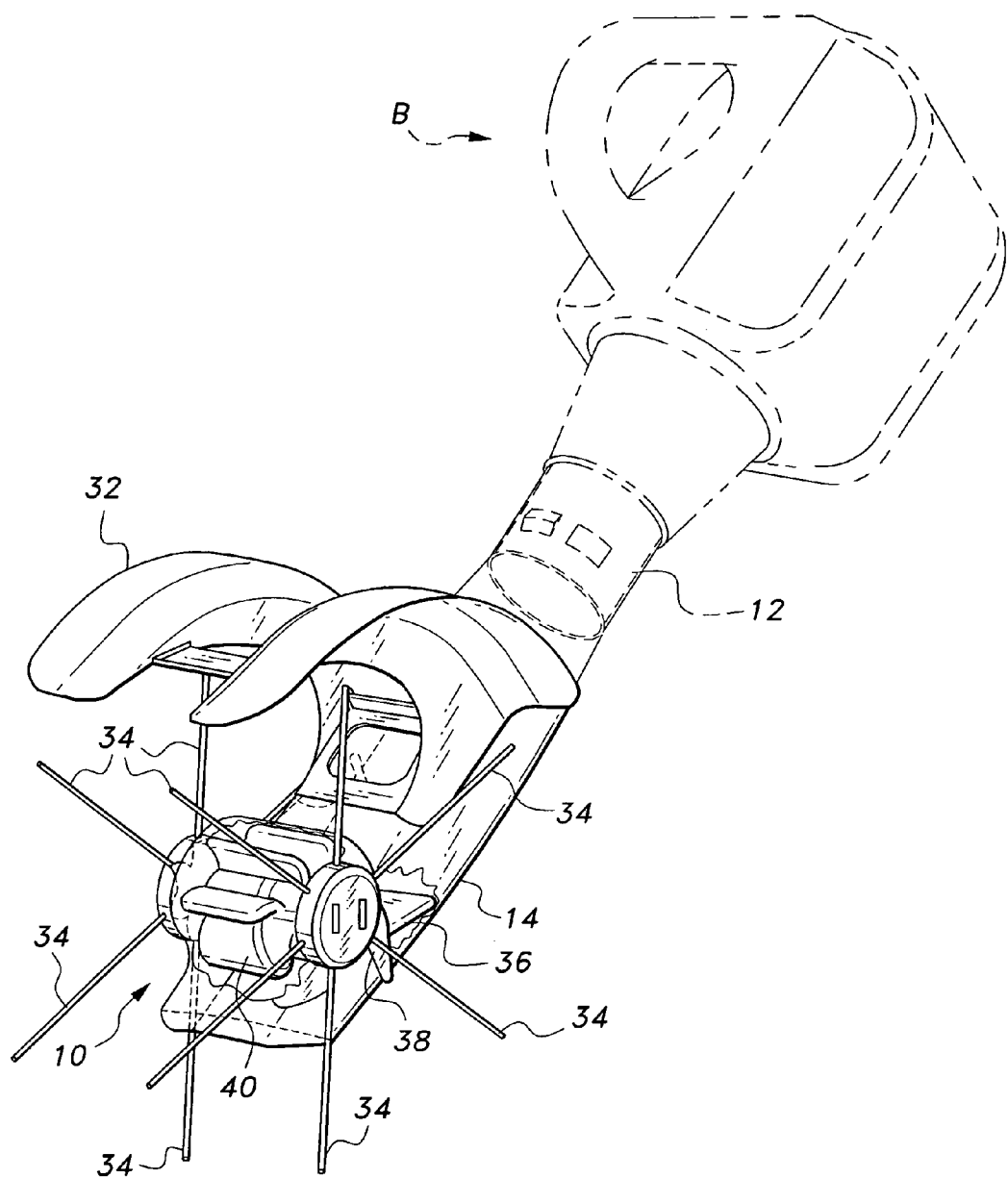
FIG. 6 is an environmental perspective view of an alternative embodiment of the air-powered rotary rake according to the present invention, shown with the spindle housing broken away to show details thereof.

The front portion 26 of housing 14 is divided by an internal wall 28 into an upper passage 30 and a lower passage 31. Housing 14 and wall 28 may be formed from plastic or any other suitable material. A flap 36 is rotatably mounted within the forward portion 26, as shown, allowing air to selectively pass into upper passage 30 or lower passage 31. Flap 36 is rotatably attached to housing 14 via a pivot pin 60 or the like, and a knob 38 is preferably attached to the pivot pin 60 external to the housing 14, allowing the user to selectively raise or lower flap 36. As will be described in greater detail below, flap 36 may alternatively be pivoted by rotational adjustment of an external safety shield 32. It should be understood that the positioning of flap 36 in FIG. 1 (and the interior dimensions of the housing 14, including wall 28) are shown for exemplary purposes only. In the alternative embodiment of FIG. 6, the flap 36 is shown as being positioned closer to the front end of housing 14, with a smaller interior wall to accommodate this positioning.

Figure 4:
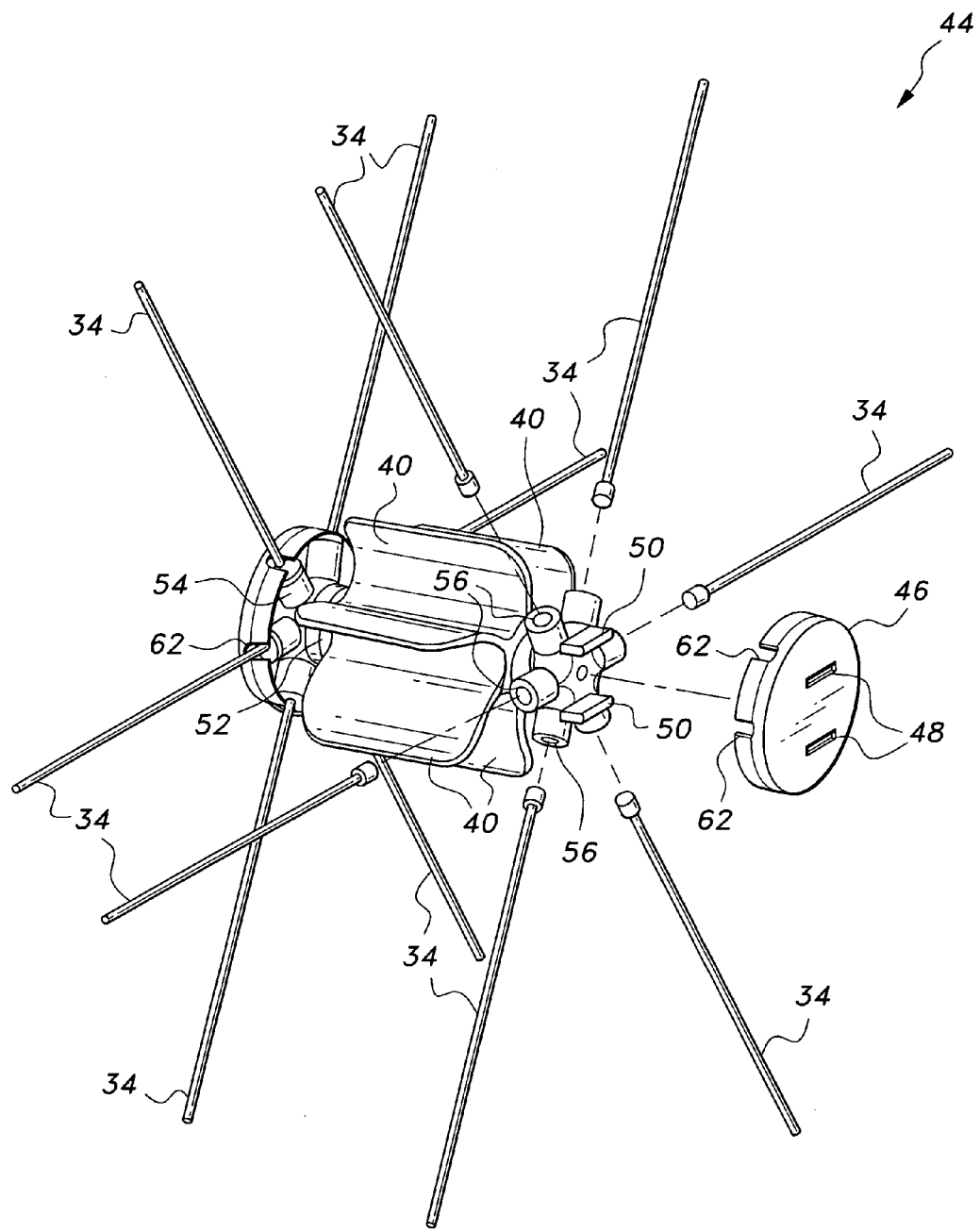
FIG. 4 is a perspective, partially exploded view of spindle and rake member assembly of the air-powered rotary rake according to the present invention.
Figure 5:
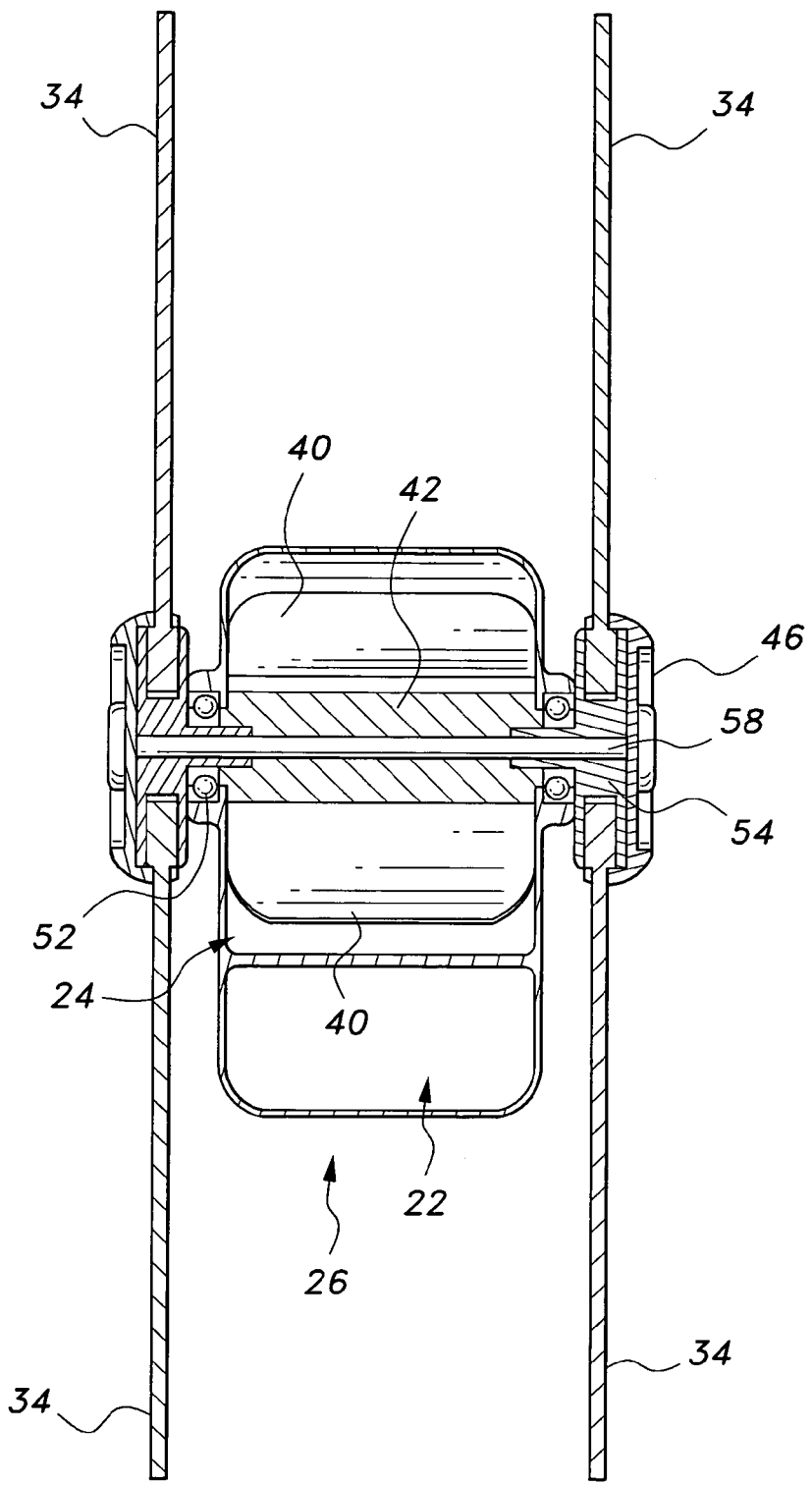
FIG. 5 is a front view in section of the head of the air-powered rotary rake according to the present invention.

When the flap 36 is in the lowered position of FIG. 2, air flows from the blower B into the upper passage 30 and out through upper front opening 24. The front portion 26 of housing 14 is configured to receive a rotating spindle 42 and a plurality of vanes 40. As best shown in FIGS. 4 and 5, the rotating rake member assembly 44 includes spindle 42, which is rotatably mounted in the front portion 26 of housing 14 by a central shaft 58 and a pair of laterally opposed bearings 52. A plurality of vanes 40 radially extend from spindle 42, and a pair of retainer wheels 54 are respectively secured to the laterally opposed ends of spindle 42. Each retainer wheel 54 includes a plurality of sockets 56 for receiving rake members 34. As shown, rake members 34 are preferably elongated, substantially cylindrical members. Sockets 56 have mounting bores for receiving and engaging rake members 34.

As best shown in FIGS. 1 and 5, retainer wheels 54 and rake members 34 are mounted external to housing 14. Each retainer 54 is covered by an end cap 46 in any suitable manner. For example, engagement members 50 may extend from retainer 54, the engagement members 50 engaging or snapping into corresponding openings 48 formed through each end cap 46, as shown in FIG. 4. Each end cap 46 includes a plurality of slots 62 spaced apart in the peripheral wall of end cap 46 for receiving rake members 34 and maintaining the rake members 34 in proper alignment. As shown in FIG. 4, rake members 34 and end caps 46 may be removed from their respective retainers 54, allowing the user to selectively use a single set of rake members 34 (i.e., mounted on the left or right of spindle 42) or both sets of rake members 34.

Returning to FIG. 2, as the air flows through the upper passage 30, the air impinging upon vanes 30 of spindle 42 causes the spindle 42 to rotate in the clockwise direction (when in the orientation of FIG. 2), which causes rotary rake members 34 to rotate in the clockwise direction. The spinning rake members 34 may then be used to dislodge leaves, dirt or the like, which would otherwise be difficult to agitate with blown air alone. In addition to the rotation of the rake members 34, the air also flows out of upper front opening 24, thus providing a stream of pressurized air in addition to the rotation of rake members 34.

Figure 3:
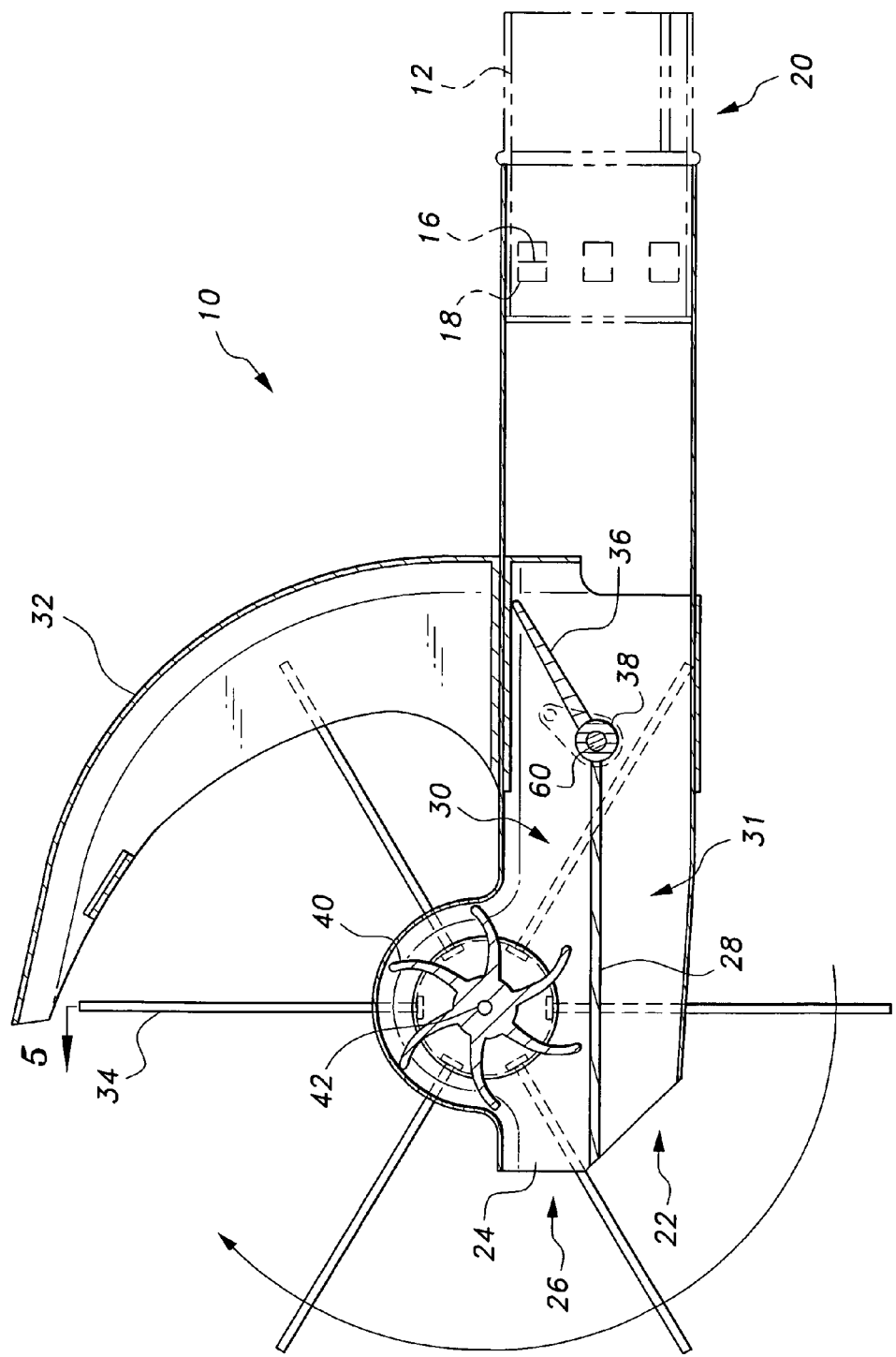
FIG. 3 is a side view in section of the air-powered rotary rake according to the present invention, showing the housing configured for airflow through a lower passage.

In FIG. 3, flap 36 is raised by selective rotation of knob 38, directing the airflow through the lower passage 31 to be expelled through lower, front opening 22, thus operating as a conventional blower, i.e., spindle 42 does not rotate. A safety shield 32 is preferably attached to the front portion 26 of housing 14, as shown. The safety shield 32 preferably has an arcuate contour and prevents debris from being hurled toward the user, while also preventing the user's body parts from coming into contact with the rotating blades 34. Safety shield 32 may be attached to flap 36 on the exterior of housing 14 adjacent knob 38, allowing safety shield 32 to be rotated with respect to housing 14. Rotation of the shield 32, in this configuration, would act to pivot flap 36, thus allowing an alternative mode of controlling the direction of airflow within housing 14.

The rake members 34 may be made from various removable and replaceable media having different properties, e.g., ferrous or nonferrous, abrasive or nonabrasive, rigid or flexible, soft cloth or bristle-like, etc.

It is to be understood that the present invention is not limited to the embodiment described above, but encompasses any and all embodiments within the scope of the following claims.

I claim:

1. An air-powered rotary rake, comprising:
   a housing defining an open interior region, the housing having opposed open front and rear ends, the rear end being adapted for releasable attachment to a source of pressurized air;
   an internal wall disposed in a front portion of the housing, the internal wall and an interior surface of the front portion defining an upper passage and a lower passage, the internal wall further dividing the open front end of the housing into an open upper front end and an open lower front end;
   a spindle rotatably mounted within the upper passage of the front portion of the housing;
   a plurality of vanes extending radially from the spindle;
   a pair of retaining wheels respectively secured to laterally opposed ends of the spindle, the pair of retaining wheels being positioned external to the front portion of the housing;
   a plurality of rake members releasably attached to the pair of retaining wheels; and
   means for selectively diverting pressurized air flow between the upper passage and lower passage, whereby when the pressurized air is diverted into the upper passage, the pressurized air impinges upon the plurality of vanes mounted on the spindle, causing the spindle to rotate, rotation of the spindle driving rotation of the plurality of rake members.

2. The air-powered rotary rake as recited in claim 1, further comprising means for releasably securing the rear end of said housing to the source of pressurized air.

3. The air-powered rotary rake as recited in claim 1, further comprising a shield attached to an outer surface of said housing and partially covering said plurality of rake members.

4. The air-powered rotary rake as recited in claim 3, wherein said shield has a substantially arcuate shape.

5. The air-powered rotary rake as recited in claim 1, wherein said means for selectively diverting the pressurized air comprises a flap pivotally mounted within the housing.

6. The air-powered rotary rake as recited in claim 5, further comprising means for selectively rotating said flap.

7. The air-powered rotary rake as recited in claim 6, wherein said means for selectively rotating said flap comprises a knob rotatably mounted on said housing and projecting outwardly therefrom, said knob being attached to said flap.

8. The air-powered rotary rake as recited in claim 1, wherein each said retaining wheel has a plurality of sockets extending radially therefrom, each said socket being adapted to releasably receive and engage one of said plurality of rake members.

9. The air-powered rotary rake as recited in claim 8, further comprising a pair of end caps, each said end cap releasably covering a respective one of the retaining wheels.

10. The air-powered rotary rake as recited in claim 9, further comprising means for releasably securing each said end cap to the respective one of the retaining wheels.

11. The air-powered rotary rake as recited in claim 10, further comprising at least one engaging member formed on each said retaining wheel, each said end cap having at least one opening formed therein, the engaging member releasably snapping into the opening in said end cap.

12. The air-powered rotary rake as recited in claim 11, wherein each said end cap has a plurality of slot formed therein, each said slot being adapted for receiving a portion of a respective one of said plurality of rake members.

13. The air-powered rotary rake as recited in claim 12, further comprising a central rotating shaft secured to said spindle and said pair of retaining wheels, said pair of retaining wheels being respectively secured to laterally opposed ends of the central rotating shaft.

14. The air-powered rotary rake as recited in claim 13, further comprising a pair of bearings secured to said housing adjacent the laterally opposed ends of said spindle.

15. An air-powered rotary rake, comprising:
a housing defining an open interior region, the housing having opposed open front and rear ends, the rear end thereof being adapted for releasable attachment to a source of pressurized air;
an internal wall disposed in a front portion of the housing, the internal wall and an interior surface of the front portion defining an upper passage and a lower passage, the internal wall further dividing the open front end of the housing into an open upper front end and an open lower front end;
a spindle rotatably mounted within the upper passage of the front portion of the housing;
a plurality of vanes extending radially from the spindle;
a pair of retaining wheels respectively secured to laterally opposed ends of the spindle, the pair of retaining wheels being positioned external to the front portion of the housing;
a plurality of rake members releasably attached to the pair of retaining wheels; and
a flap pivotally mounted within the housing for selectively diverting flow of the pressurized air between the upper passage and the lower passage, whereby when the pressurized air is diverted into the upper passage, the pressurized air impinges upon the plurality of vanes mounted on the spindle, causing the spindle to rotate, rotation of the spindle driving rotation of the plurality of rake members.

16. The air-powered rotary rake as recited in claim 15, further comprising a shield attached to an outer surface of said housing and partially covering said plurality of rake members.

17. The air-powered rotary rake as recited in claim 15, further comprising means for selectively rotating said flap.

18. The air-powered rotary rake as recited in claim 17, wherein said means for selectively rotating said flap comprises a knob rotatably mounted on said housing and projecting outwardly therefrom, said knob being attached to said flap.

19. The air-powered rotary rake as recited in claim 15, wherein each said retaining wheel has a plurality of sockets extending radially therefrom, each said socket releasably engaging one of said plurality of blades.

20. The air-powered rotary rake as recited in claim 19, further comprising a pair of end caps, each said end cap releasably covering a respective one of the retaining wheels.

* * * * *